(12) United States Patent
Gong et al.

(10) Patent No.: US 10,696,884 B2
(45) Date of Patent: Jun. 30, 2020

(54) CRYOGENIC LIQUID MEDIUM

(71) Applicant: TECHNICAL INSTITUTE OF PHYSICS AND CHEMISTRY, CHINESE ACADEMY OF SCIENCES, Beijing (CN)

(72) Inventors: Maoqiong Gong, Beijing (CN); Yanxing Zhao, Beijing (CN); Xueqiang Dong, Beijing (CN)

(73) Assignee: TECHNICAL INSTITUTE OF PHYSICS AND CHEMISTRY, CHINESE ACADEMY OF SCIENCES, Beijing (CN)

(*) Notice: Subject to any disclaimer, the term of this patent is extended or adjusted under 35 U.S.C. 154(b) by 0 days.

(21) Appl. No.: 16/368,000

(22) Filed: Mar. 28, 2019

(65) Prior Publication Data
US 2019/0218440 A1    Jul. 18, 2019

Related U.S. Application Data

(63) Continuation of application No. PCT/CN2018/081227, filed on Mar. 30, 2018.

(30) Foreign Application Priority Data

Sep. 12, 2017  (CN) .......................... 2017 1 0817332

(51) Int. Cl.
*C09K 5/00* (2006.01)
*C09K 5/10* (2006.01)
(Continued)

(52) U.S. Cl.
CPC ................. *C09K 5/10* (2013.01); *C09K 5/04* (2013.01); *C09K 5/066* (2013.01)

(58) Field of Classification Search
CPC . C09K 5/00; C09K 5/04; C09K 5/048; C09K 5/066; C09K 5/10
(Continued)

(56) References Cited

U.S. PATENT DOCUMENTS 3,260,060 A * 7/1966 Paulinkonis .............. F17C 9/02
                                                    62/47.1
3,786,814 A * 1/1974 Armao .................... A61B 18/02
                                                    606/23
(Continued)

FOREIGN PATENT DOCUMENTS

CN      1184501 A      6/1998
CN      1184502 A      6/1998
(Continued)

OTHER PUBLICATIONS

JP 2016047882 A to Fuchida et al., published Apr. 7, 2016. J-PlatPat machine translation. (Year: 2016).*

*Primary Examiner* — Jane L Stanley
(74) *Attorney, Agent, or Firm* — Hemisphere Law, PLLC; Zhigang Ma

(57) ABSTRACT

The cryogenic liquid medium provided by the present invention includes at least one of an alkane composition, an olefin composition, an alcohol composition and an ether composition, and each of the alkane composition, the olefin composition, the alcohol combination and the ether composition includes a corresponding non-toxic and harmless substance having a melting point lower than −110° C. and a standard boiling point higher than 50° C. Since the cryogenic liquid medium is formed by the non-toxic and harmless single substance having the melting point lower than −110° C. and the standard boiling point higher than 50° C. or a binary, ternary and multi-component mixture thereof, the cryogenic liquid medium has a lower atmospheric boiling point, and is difficult to volatilize. The eutectic crystal of the specific
(Continued)

mixture can be used to achieve the liquid requirements of low temperature, especially the temperature below −110° C.

4 Claims, 3 Drawing Sheets

(51) Int. Cl.
*C09K 5/04* (2006.01)
*C09K 5/06* (2006.01)

(58) Field of Classification Search
USPC .......................................................... 252/73
See application file for complete search history.

(56) References Cited

U.S. PATENT DOCUMENTS

| | | | | |
|---|---|---|---|---|
| 5,778,680 A | * | 7/1998 | Wardle | ................... F17C 13/02 |
| | | | | 62/48.2 |
| 5,801,937 A | * | 9/1998 | Gold | ...................... H02J 9/062 |
| | | | | 307/66 |
| 6,684,940 B1 | * | 2/2004 | Chao | ........................ C09K 5/10 |
| | | | | 165/104.21 |
| 8,926,858 B2 | * | 1/2015 | Jackson | ............. B23Q 11/1053 |
| | | | | 252/71 |
| 2001/0044404 A1 | * | 11/2001 | Flynn | ...................... C07C 43/12 |
| | | | | 510/412 |
| 2002/0003037 A1 | * | 1/2002 | Cousineau | ........... B23Q 11/126 |
| | | | | 165/278 |
| 2002/0094944 A1 | * | 7/2002 | Flynn | ...................... C07C 43/12 |
| | | | | 510/412 |
| 2008/0092556 A1 | * | 4/2008 | Stein | ........................ F25D 3/00 |
| | | | | 62/45.1 |
| 2011/0103011 A1 | * | 5/2011 | Koplow | ............. F04D 25/0606 |
| | | | | 361/679.54 |
| 2013/0074541 A1 | * | 3/2013 | Kaminsky | ................ B01D 7/02 |
| | | | | 62/601 |

FOREIGN PATENT DOCUMENTS

| | | | | |
|---|---|---|---|---|
| CN | 102740941 A | | 10/2012 | |
| JP | 201607882 A | * | 4/2016 | ............... C11D 7/26 |
| WO | WO 9636688 A1 | * | 11/1996 | ............... C09K 5/04 |
| WO | WO 9636689 A1 | * | 11/1996 | ............... C09K 5/04 |

* cited by examiner

CRYOGENIC LIQUID MEDIUM

FIELD OF THE DISCLOSURE

The present invention relates to the cryogenic technical field, and more particularly to a cryogenic liquid medium.

BACKGROUND

Thermostatic liquid bath is widely used in the fields such as petroleum, chemical engineering, electronic instrumentation, physics, chemistry, bioengineering, medical and health, life sciences, light industry food, physical property testing and chemical analysis, and a field source with controlled heat and cold and uniform and constant temperature is provided. The constant temperature test or testing is performed on a test sample or manufactured product, and the thermostatic liquid bath may also be used as a heat source or cold source for directly heating or refrigerating and auxiliary heating or refrigerating. Since the liquid has high density and high heat capacity, and is easy to achieve constant temperature accuracy higher than air or other gas baths, and less susceptible to environmental interference, the thermostatic liquid bath is more widely used than gas bath.

Patent ZL96244411.1, Patent CN201320651525.2, Patent CN200820121106.7, Patent 200910200263.6, Patent 200920214476.X, Patent 201310221426.5, etc., disclose thermostatic bath structures and mediums used thereby, which however, are not applicable to the liquid medium of the temperature −110° C. or below. Some manufacturing companies such as FLUKE, US, also have no related products of the temperature lower than −110° C. The underlying reason is the lack of a suitable liquid medium in such temperature region. The substances such as methane, ethane, propane, butane, R124, R22 and R32 have a very low triple point, and can exist in the form of liquid at −150° C. or even −180° C., but are extremely easy to volatize due to an excessive atmospheric boiling point. Although the commonly used thermostatic bath mediums such as methanol, ethanol and propanol have a relatively high boiling point, and are not easy to volatilize, the viscosity at about −110° C. is very high due to the limitation of the triple point, and the requirement of the uniform temperature of the thermostatic bath cannot be met. Therefore, the demand of the constant temperature on the temperature region of −110° C. and below (such as temperature calibration) is wide, but no relevant products exist on the market yet due to the lack of the liquid medium.

SUMMARY

In view of this, it is necessary to provide a cryogenic liquid medium suitable for the temperature of −110° C. and below specific to the defects of the prior art.

In order to achieve the above objective, the present invention provides the following technical solution.

A cryogenic liquid medium includes any one of an alkane composition, an olefin composition, an alcohol composition, and an ether composition, wherein the alkane composition includes a non-toxic and harmless alkane having a melting point lower than −110° C. and a standard boiling point higher than 50° C., the olefin composition includes a non-toxic and harmless olefin having a melting point lower than −110° C. and a standard boiling point higher than 50° C., the alcohol composition includes a non-toxic and harmless alcohol having a melting point lower than −110° C. and a standard boiling point higher than 50° C., and the ether composition includes a non-toxic and harmless ether having a melting point lower than −110° C., and a standard boiling point higher than 50° C.

A cryogenic liquid medium includes an alkane composition and an olefin composition, wherein the alkane composition includes a non-toxic and harmless alkane having a melting point lower than −110° C. and a standard boiling point higher than 50° C., and the olefin composition includes a non-toxic and harmless olefin having a melting point lower than −110° C. and a standard boiling point higher than 50° C.

A cryogenic liquid medium includes an alcohol composition and an ether composition, wherein the alcohol composition includes a non-toxic and harmless alcohol having a melting point lower than −110° C. and a standard boiling point higher than 50° C., and the ether composition includes a non-toxic and harmless ether having a melting point lower than −110° C., and a standard boiling point higher than 50° C.

In an embodiment, the alkane includes at least one of 2,4-dimethylpentane, 2,2-dimethylpentane, methylcyclohexane, 2,3-dimethylbutane, 2,3-dimethylpentane, 3,3-dimethylpentane, ethylcyclopentane, methylcyclopentane, isohexane, and methylpentane.

In an embodiment, the olefin includes at least one of trans-3,4-dimethyl-2-pentene, 2,4-dimethyl-2-pentene, 2-methyl-2-hexene, 2-ethyl-1-butene, trans-3-hexene, 3,3-dimethyl-1-pentene, cis-4-methyl-2-pentene, cis-3-methyl-2-pentene, 2-methyl-2-pentene, 2-methyl-1-pentene, 4,4-dimethyl-1-pentene, cis-3-heptene, 3-heptene, trans-3-heptene, 1-hexene, trans-4-methyl-2-pentene, cis-2-hexene, 3-methyl-1-pentene, 4-methyl-1-pentene, and 2,3-dimethyl-1-butene.

In an embodiment, the alcohol includes at least one of ethanol, 2-ethyl-1-butanol, sec-butanol, pentanol, 3-methyl-1-butanol, n-propanol, ethanol-d1, deuterated ethanol, and isoamyl mercaptan.

In an embodiment, the ether includes at least one of ethyl nonafluorobutyl ether and methyl nonafluorobutyl ether.

The above technical solution adopted by the present invention has the following advantages.

In one aspect, the cryogenic liquid medium provided by the present invention includes at least one of the alkane composition, the olefin composition, the alcohol composition and the ether composition, and each of the alkane composition, the olefin composition, the alcohol combination and the ether composition includes a corresponding non-toxic and harmless substance having a melting point lower than −110° C. and a standard boiling point higher than 50° C. Since the cryogenic liquid medium is formed by the non-toxic and harmless single substance having the melting point lower than −110° C. and the standard boiling point higher than 50° C. or a binary, ternary and multi-component mixture thereof, the cryogenic liquid medium has a lower atmospheric boiling point, and is difficult to volatilize. The requirement of cold carrying of −110° C. and below can be realized.

In the other aspect, the cryogenic liquid medium provided by the present invention can be applied to large-scale production and use due to the use of the substances which have no ozone destruction effect, and are environmental-friendly and harmless to a human body.

DETAILED DESCRIPTION OF PREFERRED EMBODIMENTS

Figure 1:
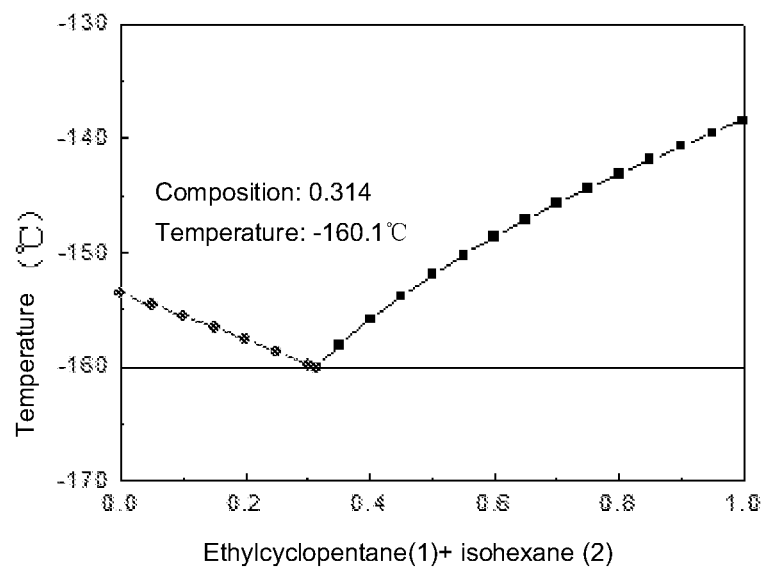
FIG. 1 is a schematic view of a eutectic temperature achieved by a cryogenic medium according to Embodiment 1 of the present invention.

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

The cryogenic liquid medium provided by the present invention includes any one of an alkane composition, an olefin composition, an alcohol composition, and an ether composition.

The alkane composition includes a non-toxic and harmless alkane having a melting point lower than −110° C. and a normal boiling point higher than 50° C.

In some embodiments, the alkane includes at least one of 2,4-dimethylpentane, 2,2-dimethylpentane, methylcyclohexane, 2,3-dimethylbutane, 2,3-dimethylpentane, 3,3-dimethylpentane, ethylcyclopentane, methylcyclopentane, isohexane, and methylpentane.

It can be understood that when the alkane includes any two, three or more of the above mixed substances, the mixture can achieve a lower melting point than any of the components, and the synthesized cryogenic liquid medium can serve as a medium for the lower temperature region.

It should be noted that the above embodiment only illustrates the possible substances of the alkane, but is not limited to the above substances in practice. The alkane can be applied to the cryogenic liquid medium as long as it has the melting point lower than −110° C. and the standard boiling point higher than 50° C. and is non-toxic and harmless.

The olefin composition includes a non-toxic and harmless olefin having a melting point lower than −110° C. and a normal boiling point higher than 50° C. In some embodiments, the olefin includes at least one of trans-3,4-dimethyl-2-pentene, 2,4-dimethyl-2-pentene, 2-methyl-2-hexene, 2-ethyl-1-butene, trans-2-hexene, 3,3-dimethyl-1-pentene, cis-4-methyl-2-pentene, cis-3-methyl-2-pentene, 2-methyl-2-pentene, 2-methyl-1-pentene, 4,4-dimethyl-1-pentene, cis-3-heptene, 3-heptene, trans-3-heptene, 1-hexene, trans-4-methyl-2-pentene, cis-2-hexene, 3-methyl-1-pentene, 4-methyl-1-pentyl and 2,3-dimethyl-1-butene.

It can be understood that when the olefin includes any two, three or more of the above mixed substances, the mixture can achieve a lower melting point than any of the components, and the synthesized cryogenic liquid medium can serve as a medium for the lower temperature region.

It should be noted that the above embodiment only illustrates the possible substances of the olefin, but is not limited to the above substances in practice. The olefin can be applied to the cryogenic liquid medium as long as it has the melting point lower than −110° C. and the standard boiling point higher than 50° C. and is non-toxic and harmless.

The alcohol composition includes a non-toxic and harmless alcohol having a melting point lower than −110° C. and a standard boiling point higher than 50° C.

In some embodiments, the alcohol includes at least one of ethanol, 2-ethyl-1-butanol, sec-butanol, pentanol, 3-methyl-1-butanol, n-propanol, ethanol-d1, deuterated ethanol and isoamyl mercaptan.

It can be understood that when the alcohol includes any two, three or more of the above mixed substances, the mixture can achieve a lower melting point than any of the components, and the synthesized cryogenic liquid medium can serve as a medium for the lower temperature region.

It should be noted that the above embodiment only illustrates the possible substances of the alcohol, but is not limited to the above substances in practice. The alcohol can be applied to the cryogenic liquid medium as long as it has the melting point lower than −110° C. and the standard boiling point higher than 50° C. and is non-toxic and harmless.

The ether composition includes a non-toxic and harmless ether having a melting point lower than −110° C. and a standard boiling point higher than 50° C.

In some embodiments, the ether includes at least one of ethyl nonafluorobutyl ether and methyl nonafluorobutyl ether.

It can be understood that when the ether includes any two, three or more of the above mixed substances, the mixture can achieve a lower melting point than any of the components, and the synthesized cryogenic liquid medium can serve as a medium for the lower temperature region.

It should be noted that the above embodiment only illustrates the possible substances of the ether, but is not limited to the above substances in practice. The ether can be applied to the cryogenic liquid medium as long as it has the melting point lower than −110° C. and the standard boiling point higher than 50° C. and is non-toxic and harmless.

In addition, the present invention also provides another implementing mode, and the cryogenic liquid medium provided by the present invention is a mixture of two compositions, that is, an alkane composition and an olefin composition. The alkane composition includes a non-toxic and harmless alkane having a melting point lower than −110° C. and a standard boiling point higher than 50° C., and the olefin composition includes a non-toxic and harmless olefin having a melting point lower than −110° C. and a standard boiling point higher than 50° C. According to the present invention, the liquid requirements below −110° C. can also be achieved by adopting the above two compositions.

In addition, the present invention also provides a third implementing mode, the cryogenic liquid medium provided by the present invention is a mixture of two compositions, that is, an alcohol composition and an ether composition. The alcohol composition includes a non-toxic and harmless alcohol having a melting point lower than −110° C. and a standard boiling point higher than 50° C., and the ether composition includes a non-toxic and harmless ether having a melting point lower than −110° C. and a standard boiling point higher than 50° C. According to the present invention, the liquid requirements below −110° C. can also be achieved by adopting the above two compositions.

The cryogenic liquid medium provided by the present invention includes the alkane composition, the olefin composition, the alcohol composition and the ether composition, and each of the alkane composition, the olefin composition, the alcohol combination and the ether composition includes a corresponding non-toxic and harmless substance having a melting point lower than −110° C. and a standard boiling point higher than 50° C. Since the cryogenic liquid medium is formed by the non-toxic and harmless single substance having the melting point lower than −110° C. and the standard boiling point higher than 50° C. or a binary, ternary and multi-component mixture thereof, the cryogenic liquid medium has a lower atmospheric boiling point, and is difficult to volatilize. The eutectic crystal of the specific mixture can be used to achieve the liquid requirements of low temperature, especially the temperature below −110° C.

The above technical solution is described in detail below in conjunction with specific embodiments.

Embodiment 1 Liquid Medium Suitable for Use at −140° C.

FIG. 1 is a schematic view of a eutectic temperature achieved by a cryogenic medium according to Embodiment 1 of the present invention. In the present embodiment, the cryogenic medium adopts a binary mixture in the alkane composition, and ethylcyclopentane and isohexane are mixed according to a certain ratio. When the ratio of the ethylcyclopentane does not exceed 50% (molar ratio), the mixture of the two can achieve a lower solid-liquid phase temperature than the respective triple points, and thus can be used as the liquid medium for a lower temperature region. In particular, when the molar ratio of the ethylcyclopentane to the isohexane is 0.314:0.686, the effect is optimal, and the eutectic temperature of the lowest temperature −160.1° C. can be achieved. At such optimum ratio, the requirement of the liquid medium of −140° C. can be met.

Embodiment 2 Liquid Medium Suitable for Use at −150° C.

Figure 2:
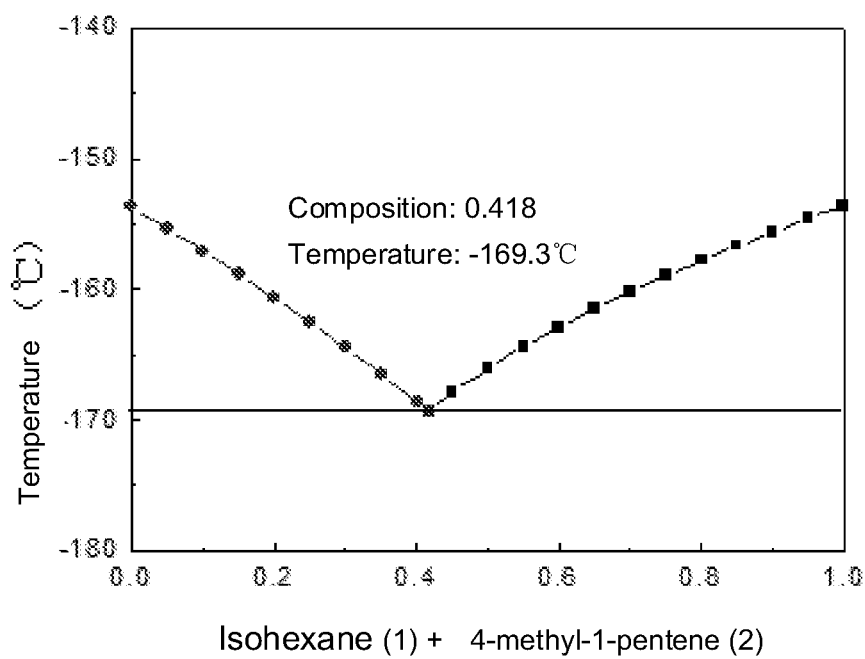
FIG. 2 is a schematic view of a eutectic temperature achieved by a cryogenic medium according to Embodiment 2 of the present invention.

FIG. 2 is a schematic view of a eutectic temperature achieved by a cryogenic medium according to Embodiment 2 of the present invention. In the present embodiment, the cryogenic medium adopts a binary mixture of an alkane composition and an olefin composition, and isohexane and 4-methyl-1-pentene are mixed according to a certain ratio. The mixture of the two can achieve a lower solid-liquid phase temperature than the respective triple points at almost any ratio, and thus can be used as the liquid medium for a lower temperature region. In particular, the effect is optimal when the molar ratio of the isohexane to the 4-methyl-1-pentene is 0.418:0.582, and the eutectic temperature of the lowest temperature −169.3° C. can be achieved. At such optimum ratio, the requirement of the liquid medium requirement of −150° C. can be met.

Embodiment 3 Liquid Medium Suitable for Use at −150° C.

Figure 3:
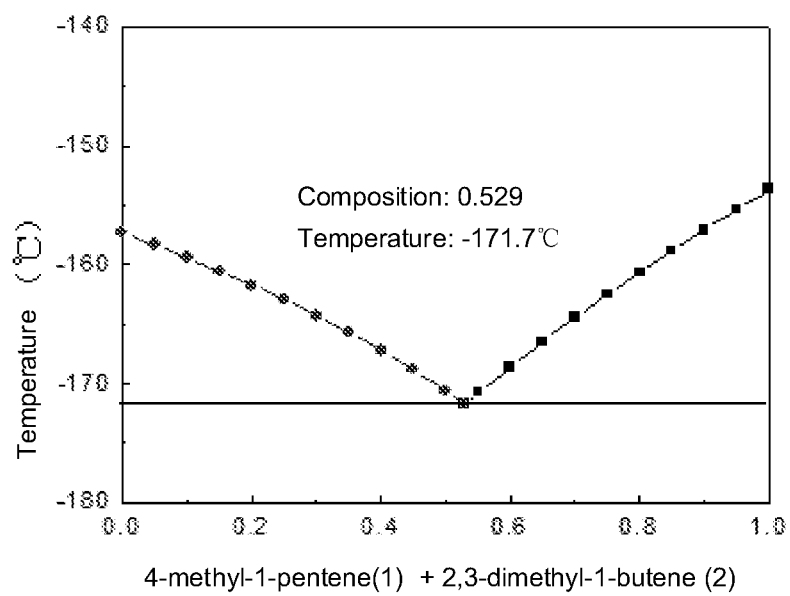
FIG. 3 is a schematic view of a eutectic temperature achieved by a cryogenic medium according to Embodiment 3 of the present invention.

FIG. 3 is a schematic view of a eutectic temperature achieved by a cryogenic medium according to Embodiment 3 of the present invention. In the present embodiment, the cryogenic medium adopts a binary mixture in the olefin composition, and 4-methyl-1-pentene and the 2,3-dimethyl-1-butene are mixed according to a certain ratio. The mixture of the two can achieve a lower solid-liquid phase temperature than the respective triple points at any ratio, and thus can be used as a liquid medium for a lower temperature region. In particular, the effect is optimal when the molar ratio of the 4-methyl-1-pentene to the 2,3 dimethyl-1-butene is 0.529:0.471, and the eutectic temperature of the lowest temperature −171.7° C. can be achieved. At such optimum ratio, the requirement of the liquid medium of −150° C. can be met.

Embodiment 4 Liquid Medium Suitable for Use at −160° C.

In the present embodiment, the cryogenic medium adopts a ternary mixture of a hydrocarbon composition and the olefin composition, and isohexane, 4-methyl-1-pentene and 2,3-dimethyl-1-butene are mixed according to a certain ratio. The mixture of the three can achieve a lower solid-liquid phase temperature than the respective triple points at almost any ratio, and thus can be used as the liquid medium for a lower temperature region. In particular, the effect is optimal when the molar ratio of the isohexane to the 4-methyl-1-pentene to the 2,3-dimethyl-1-butene is 0.25:0.25:0.5, and the eutectic temperature of the lowest temperature −176.7° C. can be achieved. At such optimum ratio, the requirement of the liquid medium requirement of −160° C. can be met.

Embodiment 5 Liquid Medium Suitable for Use at −120° C.

Figure 4:
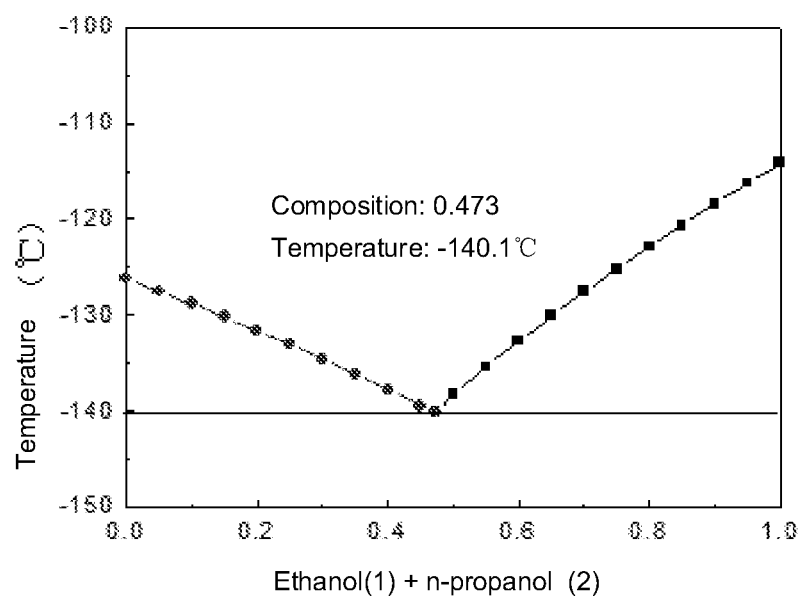
FIG. 4 is a schematic view of a eutectic temperature achieved by a cryogenic medium according to Embodiment 5 of the present invention.

FIG. 4 is a schematic view of a eutectic temperature achieved by a cryogenic medium according to Embodiment 5 of the present invention. In the present embodiment, the cryogenic medium adopts a binary mixture in the alcohol composition, and ethanol and n-propanol are mixed according to a certain ratio. When the ratio of the ethanol does not exceed 75% (molar ratio), the mixture of the two can realize a lower solid-liquid phase temperature than the respective triple points, and thus can be used as the liquid medium for a lower temperature region. In particular, the effect is optimal when the molar ratio of the ethanol to the n-propanol is 0.473:0.527, and the eutectic temperature of the lowest temperature −140.1° C. can be realized. At such optimum ratio, the requirement of the liquid medium requirement of −120° C. can be met.

Embodiment 6 Liquid Medium Suitable for Use at −130° C.

Figure 5:
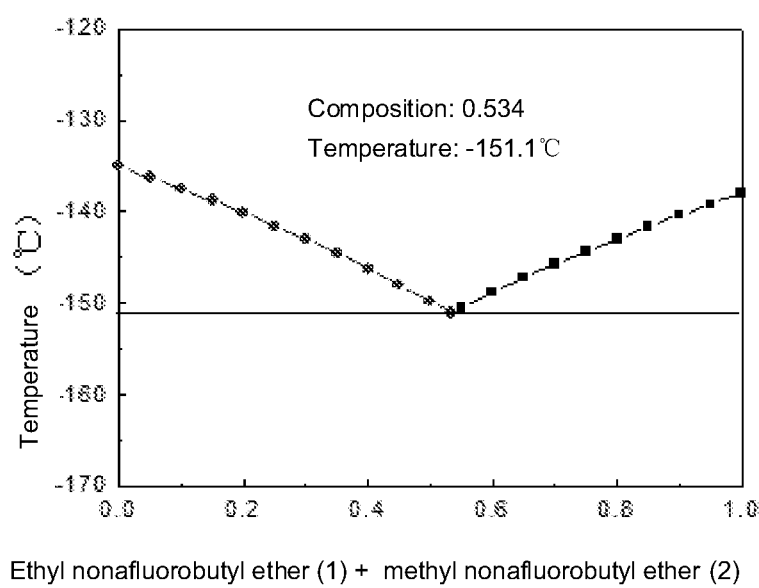
FIG. 5 is a schematic view of a eutectic temperature achieved by a cryogenic medium according to Embodiment 6 of the present invention.

FIG. 5 is a schematic view of a eutectic temperature achieved by a cryogenic medium according to Embodiment 5 of the present invention. In the present embodiment, the cryogenic medium adopts a binary mixture in the ether composition, and ethyl nonafluorobutyl ether and methyl nonafluorobutyl ether are mixed according to a certain ratio. The mixture of the two can achieve a lower solid-liquid phase temperature than the respective triple points at almost any ratio, and thus can be used as the liquid medium for a lower temperature region. In particular, the effect is optimal when the molar ratio of the ethyl nonafluorobutyl ether to the methyl nonafluorobutyl ether is 0.534:0.686, and the eutectic temperature of the lowest temperature −151.4° C. can be achieved. At such optimum ratio, the requirement of the liquid medium of −130° C. can be met.

The above Embodiments 1-6 illustrate the binary and ternary combination forms adopting part of substances. As for the quaternary combination form, a lower eutectic temperature can also be achieved, which will not be exemplified here.

Of course, the cryogenic liquid medium of the present invention may have various transformations and modifications, and is not limited to the specific structure of the above embodiments. In conclusion, the scope of protection of the present invention should include those modifications or substitutions and modifications apparent to those ordinary skilled in the art.

What is claimed is:

1. A cryogenic liquid medium, comprising an alkane composition and an olefin composition, wherein the alkane composition comprises a non-toxic and harmless alkane having a melting point lower than −110° C. and a standard boiling point higher than 50° C., and the olefin composition comprises a non-toxic and harmless olefin having a melting point lower than −110° C. and a standard boiling point higher than 50° C.;

wherein the alkane composition comprises isohexane, and the olefin composition comprises 4-methyl-1-pentene;

wherein the olefin composition further comprises 2,3-dimethyl-1-butene, and the molar ratio of the isohexane to the 4-methyl-1-pentene to the 2,3-dimethyl-1-butene is 0.25:0.25:0.5.

2. The cryogenic liquid medium according to claim 1, wherein the alkane further comprises at least one of 2,4-dimethylpentane, 2,2-dimethylpentane, methylcyclohexane, 2,3-dimethylbutane, 2,3-dimethylpentane, 3,3-dimethylpentane, ethylcyclopentane, methylcyclopentane, and methylpentane.

3. The cryogenic liquid medium according to claim 1, wherein the olefin further comprises at least one of trans-3,4-dimethyl-2-pentene, 2,4-dimethyl-2-pentene, 2-methyl-2-hexene, 2-ethyl-1-butene, trans-2-hexene, 3,3-dimethyl-1-pentene, cis-4-methyl-2-pentene, cis-3-methyl-2-pentene, 2-methyl-2-pentene, 2-methyl-1-pentene, 4,4-dimethyl-1-pentene, cis-3-heptene, 3-heptene, trans-3-heptene, 1-hexene, trans-4-methyl-2-pentene, cis-2-hexene, 3-methyl-1-pentene, and 2,3-dimethyl-1-butene.

4. The cryogenic liquid medium according to claim 1, wherein the molar ratio of the isohexane to the 4-methyl-1-pentene is 0.418:0.582.

* * * * *